United States Patent
Watzke et al.

(10) Patent No.: US 12,346,329 B2
(45) Date of Patent: Jul. 1, 2025

(54) RANGE PARTITIONED IN-MEMORY JOINS

(71) Applicant: TERADATA US, INC., San Diego, CA (US)

(72) Inventors: Michael Warren Watzke, Fitchburg, WI (US); Bhashyam Ramesh, Secimderabad (IN)

(73) Assignee: Teradata US, Inc., San Diego, CA (US)

( * ) Notice: Subject to any disclaimer, the term of this patent is extended or adjusted under 35 U.S.C. 154(b) by 350 days.

(21) Appl. No.: 17/128,764

(22) Filed: Dec. 21, 2020

(65) Prior Publication Data

US 2022/0197902 A1   Jun. 23, 2022

(51) Int. Cl.
  *G06F 16/2455* (2019.01)
  *G06F 16/22* (2019.01)
  *G06F 16/2457* (2019.01)

(52) U.S. Cl.
  CPC ...... *G06F 16/2456* (2019.01); *G06F 16/2255* (2019.01); *G06F 16/2282* (2019.01); *G06F 16/24573* (2019.01)

(58) Field of Classification Search
  CPC ............. G06F 16/2456; G06F 16/2255; G06F 16/2282
  See application file for complete search history.

(56) References Cited

U.S. PATENT DOCUMENTS 9,244,952 B2 * 1/2016 Ganti ................. G06F 16/3325
9,569,490 B1 * 2/2017 Kalarikal Janardhana ..................
                                            G06F 16/248
9,633,072 B1 * 4/2017 Kalarikal Janardhana ..................
                                            G06F 16/2455
10,275,493 B1 * 4/2019 Mostak ................. G09G 5/363
10,706,052 B2   7/2020 Ramesh et al.
10,713,255 B2   7/2020 Ramesh et al.
2004/0010776 A1 * 1/2004 Shah ................... G06F 11/3684
                                            714/E11.218
2007/0174278 A1 * 7/2007 Ramesh ............... G06F 16/278
(Continued)

FOREIGN PATENT DOCUMENTS

CN     100442292 C  * 12/2008
CN     102483762 A  *  5/2012  ........... G06F 17/301
(Continued)

OTHER PUBLICATIONS

Machine translation of RU 2755568 (Year: 2021).*
(Continued)

*Primary Examiner* — Neveen Abel Jalil
*Assistant Examiner* — Hubert Cheung
(74) *Attorney, Agent, or Firm* — Trop, Pruner & Hu P.C.

(57) ABSTRACT

In some examples, in response to a join query to join a plurality of tables, a first processing engine retrieves tuples of a first table from a subset of objects of a data store, and adds content of the retrieved tuples to an in-memory table, where the objects are range partitioned across a plurality of processing engines based on respective ranges of values of at least one join attribute in the join query. The first processing engine retrieves, from the data store, tuples of a second table of the plurality of tables based on a range of values of the at least one join attribute in the retrieved tuples of the first table. The first processing engine performs an in-memory join of the plurality of tables based on the retrieved tuples of the second table and the in-memory table.

18 Claims, 6 Drawing Sheets

(56) References Cited

U.S. PATENT DOCUMENTS

| | | | | |
|---|---|---|---|---|
| 2007/0192306 | A1* | 8/2007 | Papakonstantinou | ........................ G06F 16/951 707/999.005 |
| 2008/0147421 | A1* | 6/2008 | Buchmann | ........... G06F 16/2393 705/1.1 |
| 2011/0213766 | A1* | 9/2011 | Hong | ...................... G06F 16/22 707/718 |
| 2012/0296862 | A1* | 11/2012 | Duda | .................... G06F 16/254 707/602 |
| 2013/0166573 | A1* | 6/2013 | Vaitheeswaran | ...... G06F 16/242 707/E17.069 |
| 2013/0166598 | A1* | 6/2013 | Vaitheeswaran | ...... G06F 16/256 707/792 |
| 2014/0365533 | A1* | 12/2014 | Debray | ............... G06F 16/2228 707/803 |
| 2016/0026667 | A1* | 1/2016 | Mukherjee | ............ G06F 3/0679 707/714 |
| 2017/0212927 | A1* | 7/2017 | Kalarikal Janardhana | .................. G06F 16/248 |
| 2017/0212936 | A1* | 7/2017 | Kalarikal Janardhana | .................. G06F 16/248 |
| 2021/0034626 | A1* | 2/2021 | Watzke | ................. G06F 16/285 |
| 2021/0216519 | A1* | 7/2021 | Sarin | ................... G06F 16/2282 |

FOREIGN PATENT DOCUMENTS

| | | | | |
|---|---|---|---|---|
| CN | 110019287 | B | * 9/2021 | ......... G06F 16/2452 |
| CN | 115687478 | A | * 2/2023 | |
| RU | 2755568 | C1 | * 9/2021 | |
| WO | WO-2004023343 | A1 | * 3/2004 | ....... G06F 17/30929 |

OTHER PUBLICATIONS

Dewitt et al., 2013. Split query processing in polybase. In Proceedings of the 2013 ACM SIGMOD International Conference on Management of Data (SIGMOD '13). Association for Computing Machinery, New York, NY, USA, 1255-1266. https://doi.org/10.1145/2463676.2463709 (Year: 2013).*
Wikipedia, Microsoft Azure last edited Nov. 22, 2019 (8 pages).
Wikipedia, Google Storage last edited Nov. 2, 2019 (2 pages).
Wikipedia, Amazon S3 last edited Nov. 26, 2019 (8 pages).
Watzke et al., U.S. Appl. No. 16/720,389 entitled Assignment of Objects To Processing Engines for Efficient Database Operations filed Dec. 19, 2019 (32 pages).

* cited by examiner

OBJECT INDEX METADATA
126

| OBJECT | MIN | MAX |
|---|---|---|
| 1 | 1 | 201 |
| 2 | 202 | 408 |
| 3 | 408 | 609 |
| 4 | 625 | 802 |
| 5 | 810 | 950 |
| 6 | 2 | 300 |
| 7 | 301 | 504 |
| 8 | 509 | 700 |
| 9 | 712 | 830 |
| 10 | 850 | 999 |

SORTED OBJECT INDEX METADATA
608

| OBJECT | MIN | MAX | UOP (404) | DUPLICATE (406) |
|---|---|---|---|---|
| 1 | 1 | 201 | 1 | N |
| 6 | 2 | 300 | 1 | N |
| 2 | 202 | 408 | 1 | N |
| 7 | 301 | 504 | 1 | N |
| 3 | 408 | 609 | 1 | Y READ > 559 BY UOP 2 |
| 8 | 509 | 700 | 2 | Y READ <= 559 BY UOP 1 |
| 4 | 625 | 802 | 2 | N |
| 9 | 712 | 830 | 2 | N |
| 5 | 810 | 950 | 2 | N |
| 10 | 850 | 999 | 2 | N |

402-1, 402-2, 402-3, 402-4, 402-5, 402-6, 402-7, 402-8, 402-9, 402-10

614
UOP OBJECT ASSIGNMENT LIST

RANGE PARTITIONED IN-MEMORY JOINS

BACKGROUND

A relational database management system (DBMS) stores databases that include collections of logically related data arranged in a predetermined format, such as in tables that contain rows and columns. To access the content of a table in a database, queries according to a standard database query language (such as the Structured Query Language or SQL) are submitted to the database. A query can also be issued to insert new entries into a table of a database (such as to insert a row into the table), modify the content of the table, or to delete entries from the table. Examples of SQL statements include INSERT, SELECT, UPDATE, and DELETE.

In other examples, object stores can be used to store objects that are usually larger in size than rows of a table in a relational DBMS. The object stores can be provided in a cloud that is accessible over a network, for example.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Figure 1:
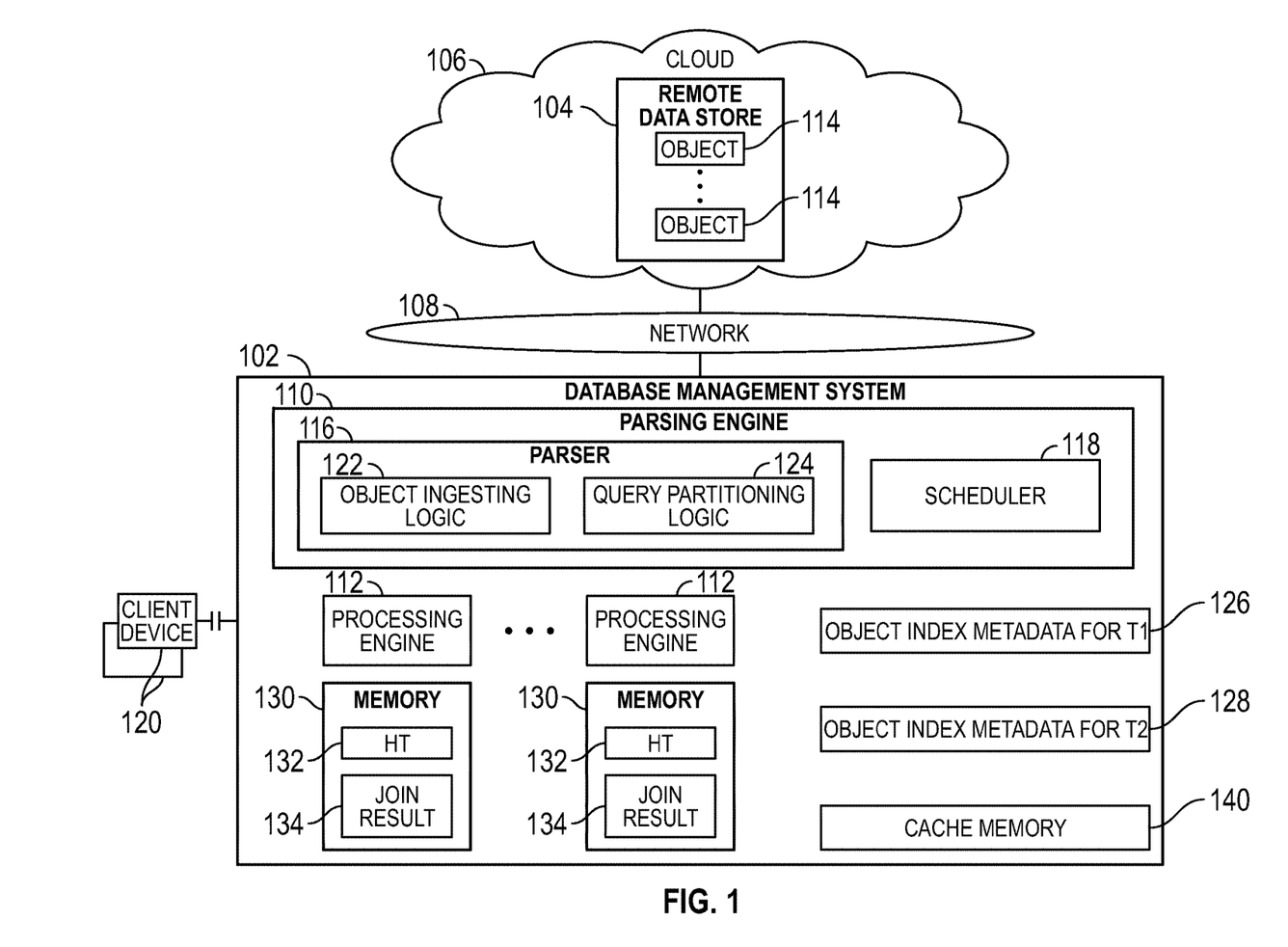
FIG. 1 is a block diagram of an example arrangement that includes a database management system and a logically disconnected remote data store, according to some implementations of the present disclosure.

FIG. 1 is a block diagram of an example arrangement that includes a database management system (DBMS) 102 and a remote data store 104. In some examples, the remote data store 104 is an object store that stores objects 114. As used here, an "object" can refer to any separately identifiable or addressable unit of data.

In some examples, the remote data store 104 can be accessible in a cloud 106. A "cloud" can refer to any infrastructure, including computing, storage, and communication resources, that can be accessed remotely by user devices over a network, such as a network 108 shown in FIG. 1. Alternatively, the remote data store 104 can be provided in a data center or in any other computing environment.

The network 108 can include a public network (e.g., the Internet), a local area network (LAN), a wide area network (WAN), a wireless network (e.g., a wireless local area the network or WLAN, a cellular network, etc.), or any other type of network.

The remote data store 104 in some examples can be an object store, which can be one of any of various different types of object stores. For example, an object store can be according to any of the following: Simple Storage Service (S3) from AMAZON WEB SERVICES (AWS), Google Cloud Storage, Microsoft AZURE, and so forth.

The DBMS 102 includes a parsing engine 110 that is able to process SQL queries, including data definition language (DDL) statements and data manipulation language (DML) statements.

In addition to the parsing engine 110, the DBMS 102 includes multiple processing engines 112.

As used here, an "engine" (e.g., the parsing engine 110 or a processing engine 112) can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, an "engine" can refer to a combination of a hardware processing circuit and machine-readable instructions (software and/or firmware) executable on the hardware processing circuit.

The multiple processing engines 112 are able to execute in parallel with one another, and are able to access, in parallel, different data portions (e.g., different objects 114, different portions of objects 114) of the remote data store 104. Each processing engine 112 is considered a Unit of Parallelism (UOP) that is able to execute in parallel (e.g., concurrently or simultaneously) with one or more other UOPs. Each UOP is able to perform a local relational operation, such as a join operation (e.g., to join data from multiple tables), a data aggregation operation (to aggregate multiple pieces of data into an aggregate value, such as a sum, maximum, minimum, average, median, etc.), an ordered analytic operation, and so forth. An ordered analytic operation refers to a operation that has an order specification (specifying an order based on one or more attributes, e.g., sorting based on the one or more attributes) or an expression that performs some predetermined analysis, such as ranking, computing a moving average within a window size, calculating a cumulative total, calculating a percentile, and so forth.

Traditionally, a DBMS stores data in relational databases stored in a block-based storage, in which data is stored as blocks that are smaller in size than objects of object stores. For example, a block-based storage can include disk-based storage devices, solid state storage devices, and so forth. The block-based storage can be connected to the DBMS over a relatively high-speed link, such that the DBMS can access (read or write) data in a relational database with relatively low input/output (I/O) latency (i.e., the delay between a time that a request is submitted and a time that the request is satisfied at the storage is relatively low). The block-based storage can be considered a local storage of the DBMS, since the DBMS is able to access the block-based storage with relatively low I/O latency.

In some examples, instead of or in addition to coupling block-based storage to the DBMS 102, the DBMS 102 can work with the remote data store 104, which can be provided in the cloud 106 or another remote computing environment. The objects 114 of the remote data store 104 can have variable sizes, and each object can have a size between 10 megabytes (MB) and 100 MB. In other examples, an object can have a smaller or larger size.

When responding to a SQL query, the DBMS 102 can access (write or read) data of the remote data store 104, rather than data in a relational table (or relational tables) of a local block-based storage. In some examples, accessing data of the remote data store 104 can have a higher I/O latency than accessing data of a local block-based storage. Note that the DBMS 102 can include caches to store a portion of the data for improving efficiency in data access. Data can be accessed from the caches of the DBMS 102 more quickly than data of the remote data store 104.

The arrangement according to FIG. 1 is according to a disconnected compute and storage architecture, in which a compute environment (including the DBMS 102) and a storage environment (including the remote data store 104) are logically disconnected from one another. Logical disconnection of the compute environment and the storage environment can refer to an arrangement in which data objects 114 (or other data portions) of the storage environment (including the remote data store 104) are not owned (assigned to) specific processing engines 112, but instead, the assignment of data objects 114 (or other data portions) of the storage environment to the processing engines 112 can change over time (such as from query to query). For example, to process a first query, a first object 114 may be assigned to a first processing engine 112, and a second object 114 may be assigned to a second processing engine 112. However, to process a second query, the first and second objects 114 may be assigned to the first processing engine 112, and other objects may be assigned to the second processing engine 112.

In a traditional DBMS that includes local storage, data stored in the local storage can be divided into multiple logical data subdivisions by hashing the data. The logical data subdivisions can be assigned to respective UOPs.

In the disconnected compute and storage architecture, using a hashing technique to create multiple logical data subdivisions assigned to respective UOPs may present various issues. First, if the number of logical data subdivisions is large, that may result in small objects 114 stored in the remote data store 104. A large number of small objects 114 in the remote data store 104 can result in storage fragmentation, which can be inefficient. Also, accessing small objects 114 in an object store may not be efficient, as object stores may be designed to employ larger objects. Another issue is that if there are too few logical data subdivisions, then processing skew may occur where one processing engine 112 has a larger workload than another processing engine 112 due to imbalance in the assignment of data portions to respective processing engines 112.

Also, in the disconnected compute and storage architecture, traditional techniques do not allow UOP local relational operations: join, aggregation etc. a UOP local relational operation refers to an operation, such as a join operation, performed at a given UOP (processing engine 112) where data for the operation are locally stored, such that redistribution of data across the UOPs does not have to be performed to support the operation.

In accordance with some implementations of the present disclosure, object range partitioning is employed when processing a query (such as a join query to join tables) to assign objects to respective processing engines 112. Details of object range partitioning are explained in further detail below. The object range partitioning can be used to support UOP local join operations in a disconnected compute and storage architecture. A join operation combines data records from two or more relational tables. Examples of join operations include hash join operations as well as other types of join operations in which multiple relational tables are joined.

As used here, a "data record" can refer to any unit of data. For example, the data record can be in the form of a row of a table, a table, a materialized view, or any other piece of data. Each data record can have multiple attributes. In a table row, the multiple attributes can be the multiple columns of the table row. Each attribute is assigned a value in the corresponding data record.

In a hash join operation involving two tables (T1 and T2), a hash table can be built based on one of the two tables (usually the smaller table). The joining of the tables is based on join attribute(s), which is (are) part of a predicate of a database query specifying a join operation (referred to as a "join query"). If the predicate including the join attribute(s) is satisfied for rows of tables T1 and T2, then a join of the rows is performed. In an example where the hash table is built based on table T1, a hash function is applied on the join attribute(s) in the rows (also referred to as "tuples") of table T1. The output of the hash function is a hash value (also referred to as a "hash table key") that is an index to a bucket of the hash table, which includes multiple buckets that map to respective different hash table keys. A "hash function" refers to a function that takes as input value(s) of attribute(s) of a table row, and produces a number as an output. Different input attribute value(s) may map to different numbers (i.e., different hash table keys). In some cases, different input attribute value(s) may map to the same number, which is referred to as a collision.

At least some of the attributes (also referred to as "columns") of each row of table T1 are stored in a respective bucket of the hash table. In some cases, all of the attributes of each row of table T1 are stored in the respective bucket of the hash table. In other cases, a subset (less than all) of the attributes of each row of table T1 are stored in the respective bucket of the hash table; for example, the subset of the attributes can include projected attributes of the join query (i.e., those attributes that are selected for output in a SELECT clause of the join query).

To perform a join, table T2 (referred to as a "probe table") is evaluated with respect to the hash table. For example, a hash function is applied to each row of table T2 to produce a hash key that maps to a bucket of the hash table. The DBMS 102 then determines if there is a matching row in the bucket, and if so, the row (or a subset of the row) from table T2 is output to a join result.

Although reference is made to hash joining two tables in some examples, it is noted that similar techniques can be extended to hash joining more than two tables. Also, similar techniques can be applied to other types of joins of tables.

In accordance with some implementations of the present disclosure, an in-memory join of two or more tables can be performed based on range partitioning objects containing data records of the two or more tables across the multiple processing engines 112. In some examples, the range partitioning is based on values of the join attribute(s) in a join query.

An in-memory join refers to a join operation where data of the two or more tables is retrieved into a memory associated with a given processing engine, such that the given processing engine can perform a local join operation with the data in the memory (without having to overflow data from the memory to a secondary storage.

The parsing engine 110 of the DBMS 102 can include a parser 116 and a scheduler 118. The parser 116 or scheduler 118 can be part of the hardware processing circuit of the parsing engine 110, or can include machine-readable instructions executable on the parsing engine 110.

The parser 116 receives database queries (such as SQL queries, load requests, etc.) submitted by one or more client devices 120, which may be coupled to the DBMS 102 over an interconnect (e.g., the network 108 or another link). The parser 116 parses each received database query, and generates executable steps for the parsed query. The parser 116 includes an optimizer (not shown) that generates multiple query plans in response to a query. The optimizer selects the most efficient query plan from among the multiple query plans. Each query plan includes a sequence of executable steps to perform to process the database query. The scheduler 118 sends the executable steps of the selected query plan to respective processing engines 112.

Each processing engine 112 manages access of data in respective objects 114 in the remote data store 104. Each processing engine 112 can perform the following tasks: inserts, deletes, or modifies contents of tables or other data records; creates, modifies, or deletes definitions of tables or other data records; retrieves information from definitions and tables or other data records; locks databases and tables or other data records; and so forth.

The parser 116 includes an object ingesting logic 122 and a query partitioning logic 124. The object ingesting logic 122 and the query partitioning logic 124 can be part of the parser 116 or outside of the parser 116. Alternatively, the object ingesting logic 122 and the query partitioning logic 124 can be separate from the parsing engine 110.

Although shown as two different logic, the object ingesting logic 122 and the query partitioning logic 124 can be part of the same logic in other examples.

The object ingesting logic 122 performs ingesting of data records into the objects 114 of the remote data store 104, from one or more sources, which can include one or more client devices 120 or any other source. Ingesting of data into the objects 114 of the remote data store 104 can be responsive to a write operation, a load operation, or any other operation that causes data to be inserted into the remote data store 104. During ingesting of data into the remote data store 104, the data is both horizontally organized and vertically organized based on use of one or more clustering attributes in the data.

A "clustering attribute" can refer to an attribute that has been specified for use in partitioning data records into multiple different partitions. In some examples, a single clustering attribute can be used to partition data records into multiple partitions. For example, data records with values of the clustering attribute that fall within a first range can be assigned to a first partition, data records with values of the clustering attribute that fall within a second range can be assigned to a second partition, and so forth.

In other examples, multiple clustering attributes can be used for organizing data records across multiple different partitions.

For join operations, the clustering attribute(s) can be the join attribute(s) specified in a join query.

During ingesting of the data records into the remote data store 104, as data records are inserted into respective objects 114, metadata associated with the each object 114 into which a data record is inserted can be updated (if appropriate) to reflect new minimum and/or maximum values of the clustering attribute. The metadata associated with each object 114 is referred to as an object index metadata, which can be stored as object index metadata 126.

The minimum value of the clustering attribute for a given object 114 is the lowest clustering attribute value from among the clustering attribute values of the data records in the given object 114. For example, if there are N data records (e.g., N table rows) in the given object 114, each of the N data records includes a value of the clustering attribute. The minimum value of the clustering attribute for the given object 114 is the lowest clustering attribute value from among the clustering attribute values of the N data records.

Similarly, the maximum value of the clustering attribute for the given object 114 is the largest clustering attribute value from among the clustering attribute values of the data records in the given object 114.

When a new data record (having a particular clustering attribute value) is inserted into the given object 114, the object ingesting logic 122 can compare the particular clustering attribute value to the minimum and maximum values of the clustering attribute for the given object 114 contained in the object index metadata 126. If the particular clustering attribute value of the new data record is less than the minimum value of the clustering attribute for the given object 114, then the object ingesting logic 122 updates the object index metadata 126 to set the particular clustering attribute value of the new data record as the minimum value of the clustering attribute for the given object 114. Similarly, if the particular clustering attribute value of the new data record is greater than the maximum value of the clustering attribute for the given object 114, then the object ingesting logic 122 updates the object index metadata 126 to set the particular clustering attribute value of the new data record as the maximum value of the clustering attribute for the given object 114.

Horizontal organization of the data records during ingestion into the remote data store 104 refers to partitioning the data records such that different processing engines 112 insert different partitions of the data records into respective objects 114 of the remote data store 104.

Assume there are 1,000 orders to be inserted into table T1, where each order is identified by an order identifier (OID) attribute (which can range in value from 1 to 1,000) in this example. Also assume that each order has 5 line items, so that there are in total 5,000 data records (e.g., rows) in the 1,000 orders.

In the ensuing discussion, it is assumed that the OID attribute is the clustering attribute. It is also assumed that an object 114 in the remote data store 104 can hold 1,250 rows, and that there are two processing engines 112 (two UOPs).

If the data is horizontally partitioned at ingest time based on the OID attribute, then the lowest 500 orders (with OID attribute values between 1 to 500) are sent by the object ingesting logic 122 to the first processing engine 112, and the highest 500 orders (with OID attribute values between 501 to 1,000) are sent by the object ingesting logic 122 to the second processing engine 112.

Thus, the first processing engine 112 inserts the rows of orders 1 to 250 into object 1, and inserts the rows of orders 251 to 500 into object 2.

Similarly, the second processing engine 112 inserts the rows of orders 501 to 750 into object 3, and inserts the rows of orders 751 to 1,000 into object 4.

Vertical organization of the data records at ingest time can refer to sorting, by each processing engine 112, the data records according to the clustering attribute. In the foregoing example, the first processing engine 112 sorts the rows of orders 1-500 by the OID attribute values, and inserts the sorted rows into objects 1 and 2, and the second processing engine 112 sorts the rows of orders 501-1,000 by the OID attribute values, and inserts the sorted rows into objects 3 and 4.

In other examples, during ingesting of data records into the remote data store 104, the horizontal and vertical organization of the data records can be based on multiple clustering attributes. In examples where multiple clustering attributes are used, the multiple clustering attributes can be mapped to a single sort key that includes the multiple clustering attributes. The values of the sort key are then used for performing the horizontal and vertical organization of data records.

In some examples, the object index metadata 126 can be for data records (e.g., rows) of a first table (e.g., T1). Similar techniques can be applied to maintain object index metadata 128 for data records ingested into objects 114 for a second table (e.g., T2). There can be additional object index metadata for other tables.

The object index metadata 126 and 128 can be stored in memories 130 that are associated with the processing engines 112. The memories 130 can be part of the respective processing engines 112, or can be external of but accessible by the processing engines 112.

A memory can be implemented using one or more memory devices. A memory device can include a volatile memory device, such as a dynamic random access memory (DRAM) device, a static random access memory (SRAM) device, and so forth. Alternatively, a memory device can include a nonvolatile memory device, such as a flash memory device, or any other type of nonvolatile memory device.

Once data records are ingested into the remote data store 104 (i.e., inserted into the objects 114), queries to access the data records can be received by the parsing engine 110. The queries can include a join query or another type of query.

The ensuing discussion refers to examples involving a join query, such as a join query that specifies a hash join operation of tables T1 and T2.

In response to the join query, the query partitioning logic 124 can perform range partitioning and assign objects to respective processing engines 112 based on the range partitioning, in accordance with some implementations of the present disclosure. Further details regarding range partitioning are provided below, such that it is assumed that each of the object index metadata 126 for table T1 has been partitioned across the memories 130 associated with the processing engines 112 according to values of the join attribute(s) included in the join query.

Figure 2:
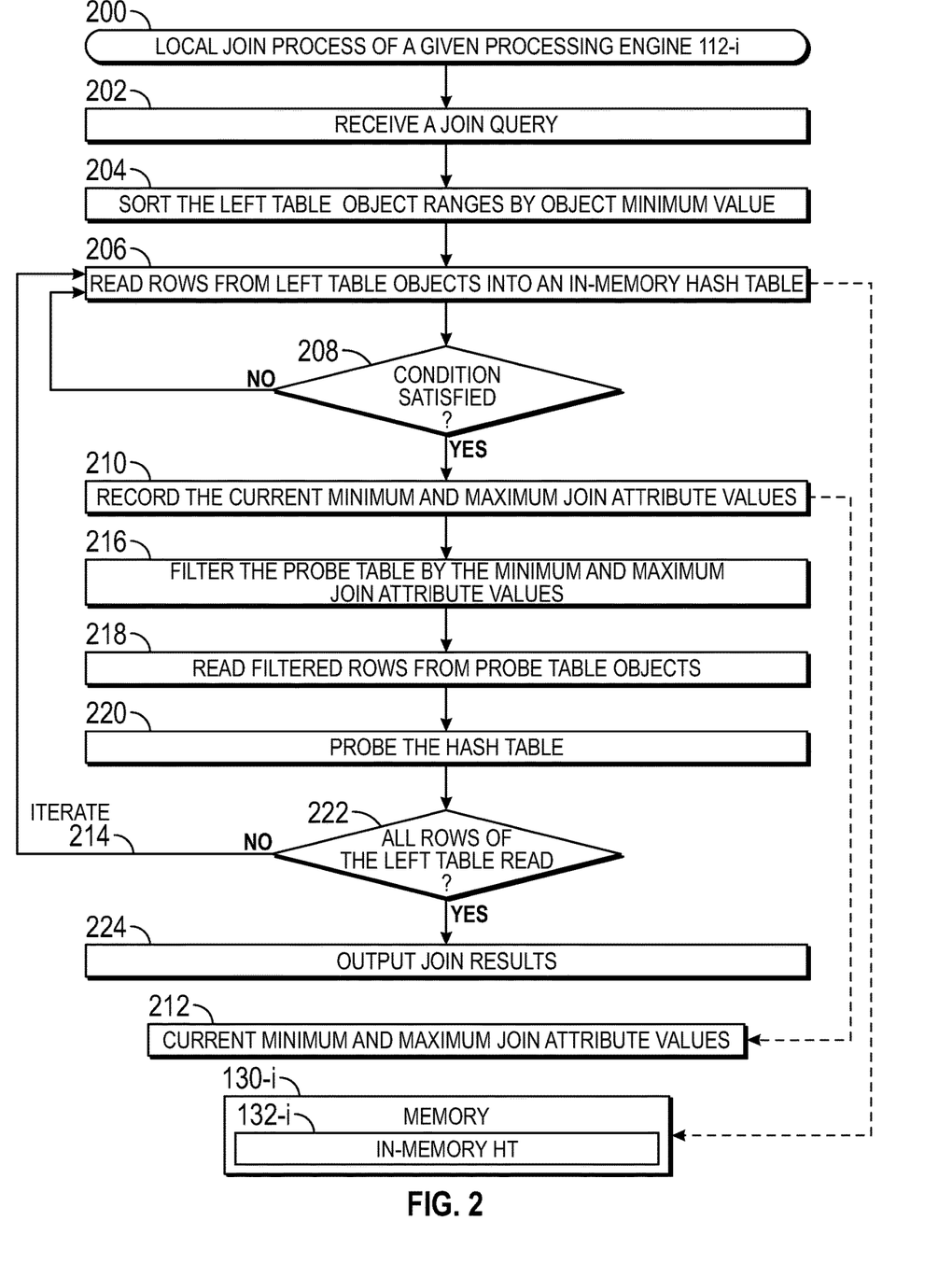
FIG. 2 is a flow diagram of a local hash join process according to some implementations of the present disclosure.

Referring further to FIG. 2, a local hash join process 200 is illustrated. The local join process 200 of FIG. 2 is performed by a given processing engine 112-$i$ of the processing engines 112 using a local memory 130-$i$ (one of the memories 130 that is associated with the given processing engine 112-$i$). Each processing engine 112 can perform a respective local join process in parallel on respective portions of tables T1 and T2, in response to a particular join query.

Figure 3:
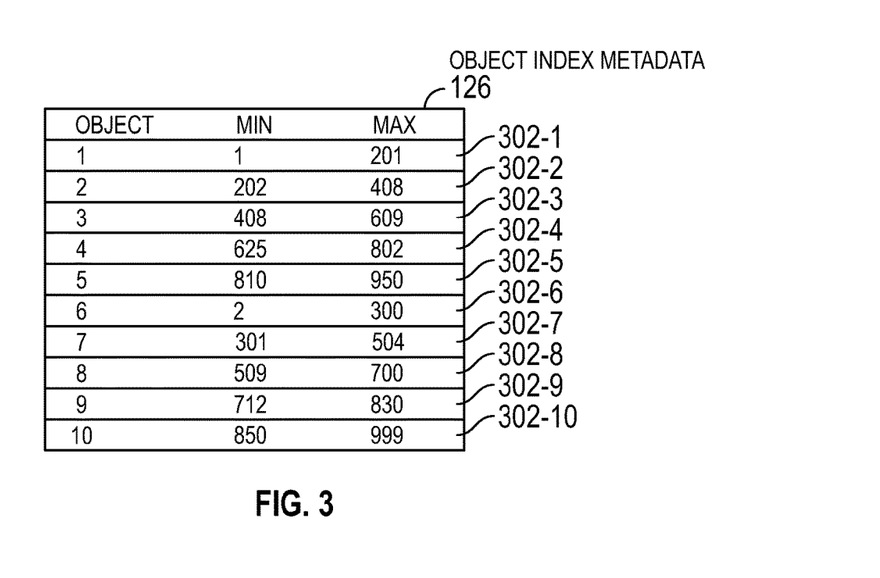
FIG. 3 illustrates an example of object index metadata for objects stored in a data store, according to some examples.

FIG. 3 shows an example of the object index metadata 126 for table T1. The example object index metadata 126 includes 10 entries 302-1 to 302-10 for 10 respective objects. The first entry 302-1 is for object 1, and the first entry 302-1 contains the minimum value and the maximum value of an attribute of table T1. The remaining entries 302-2 to 302-10 contain respective minimum and maximum values of the table T1 attribute of corresponding objects 2-10. Although FIG. 3 shows minimum and maximum values for one attribute, the object index metadata 126 can include additional minimum/maximum values for other attributes of table T1.

Also, the object index metadata 126 can further include other metadata aside from minimum/maximum values of one or more attributes of table T1.

In some examples, it is assumed that the minimum and maximum values shown in FIG. 3 are those of a join attribute included in a join query received (at 202).

The object index metadata 128 for table T2 can have a similar arrangement.

Range partitioning of the objects containing table T1 can be performed to assign a subset of objects 1-10 to the given processing engine 112-$i$. The range partitioning of the objects containing table T1 can assign other subset(s) of objects 1-10 to other processing engine(s) 112. In the example of FIG. 3, it can be assumed that the range partitioning has assigned objects 1, 6, 2, 7, and 3 to the given processing engine 112-$i$, and has assigned other objects 8, 4, 9, 5, and 10 to another processing engine. An example of how such a range partitioning is performed based on the join attribute ranges in FIG. 3 is discussed further below in connection with FIGS. 4 and 5.

A similar range partitioning of objects containing table T2 can be performed based on the object index metadata 128 to assign a subset of the objects containing table T2 to the given processing engine 112-$i$.

The given processing engine 112-$i$ sorts (at 204) the left table object ranges (associated with the subset of objects 1-10 assigned to the given processing engine 112-$i$) by object range minimum value. In the present discussion, the "left table" refers to the table (e.g., table T1) from which a hash table 132 is derived to perform the local join process 200 at the given processing engine 112-$i$. The hash table 132 is an in-memory hash table stored in the local memory 130-$i$ associated with the given processing engine 112-$i$.

An "object range" refers to a range defined by the minimum value and the maximum value of the join attribute in the data records of a respective object. For example, in FIG. 3, object 1 has an object range {1, 201} (a range of values of the join attribute starting at 1 and ending at 201), object 2 has an object range {202, 408}, and so forth.

In the example of FIG. 3, sorting by the object range minimum value refers to sorting by the value in the minimum column in FIG. 3.

After the sorting, the local join process 200 reads (at 206) rows from left table objects (the subset of objects 1-10 assigned to the given processing engine 112-$i$) from the remote data store 104 into an in-memory hash table 132-$i$ stored in the local memory 130-$i$. The left table objects contain the rows of the left table, e.g., table T1.

The rows of the left table objects are read from the remote data store 104 over the network 108 by the given processing engine 112-$i$. In some examples, the left table objects may not store data records containing the rows of the left table in a relational table format. In such examples, as part of reading the rows of the left table objects, the given processing engine 112-$i$ can convert the data records from the left table objects into the relational table format before processing of the join query. In other cases, the left table objects may store rows of the table T1 in the relational table format.

Reading rows from the left table objects into the in-memory hash table 132 involves applying a hash function on each row of the left table objects that are read from the remote data store 104, and placing the content of the left table rows into a corresponding bucket of the hash table 132. The corresponding bucket is the bucket referred to by the hash table key generated by the hash function based on applying the hash function on a row.

The given processing engine 112-*i* continues to read (at 206) rows from the left table objects into the hash table 132 until the given processing engine 112-*i* determines (at 208) that a condition is satisfied. The condition is satisfied if the retrieved rows occupy a specified amount of the local memory 130-*i* is occupied by the retrieved rows, or there are no more rows to retrieve from the left table objects.

The given processing engine 112-*i* records (at 210) the current minimum and maximum join attribute values (212) of the rows of the left table objects that have been retrieved into the hash table 132 in a current iteration. Note that multiple iterations (214) may be performed if the local memory 130-*i* is unable to fit the content of all of the rows of the left table objects assigned to the given processing engine 112-*i* by the range partitioning. The recorded current minimum and maximum join attribute values (212) of the left table objects that have been retrieved into the hash table 132 can be different for different iterations.

The given processing engine 112-*i* filters (at 216) the probe table (e.g., table T2) by the current minimum and maximum join attribute values (212). In other words, rows of the probe table with join attribute values outside the range of the current minimum and maximum join attribute values (212) are not considered for the local join process 200, and thus would not be retrieved from the remote data store 104. This reduces the amount of data of the probe table that has to be retrieved, and thus reduces latency and network bandwidth consumption associated with reading rows of the probe table from the remote data store 104. Techniques according to some implementations allow for the ability to reduce the number of accesses of data from the left table and the probe table. In cases where the hash table does not fit in memory and is overflowed to secondary storage, the probe table would have to be re-read for each overflow chunk of the hash table. In cases where data of the left table and probe table are pre-fanned out into chunks that fit into memory, data of both tables would have to be read and written. Techniques according to some implementations allow both tables to be read just once if there is minimal range overlap between the memory sized chunks of the tables.

The given processing engine 112-*i* reads (at 218) the filtered rows from probe table objects (the subset of objects containing table T2 assigned to the given processing engine 112-*i* based on the object index metadata 128) from the remote data store 104 into the local memory 130-*i*.

The rows of the probe table that are read by the processing engine 112 are used to probe (at 220) the hash table 132 to locally join the rows of tables T1 and T2. The probing involves applying the hash function to the rows of the probe table to produce respective hash table keys that map to corresponding buckets of the hash table 132. Then the content in each mapped bucket of the hash table 132 is compared to each respective row of the probe table to determine if there is a match according to the join predicate in the join query. If a match, then respective output content (e.g., projected attributes from tables T1 and T2 in the SELECT clause of the join query) is added to a join result 134 stored in the local memory 130-*i*. The join result 134 can be stored in an output result area in primary or secondary storage.

The process is re-iterated (at 214) until all the rows of the left table and the probe table are read (as determined at 222) and joined by the processing engine 112-*i* in the local join process 200. The join result is output (at 224).

The ensuing discuss refers to range partitioning according to some examples of the present disclosure, to assign subsets of objects to respective processing engines 112.

In some examples, different range partitioning can be performed in response to receipt of each query. Thus, it is possible that for different queries, the ownership of objects can change, where an "ownership" of an object can refer to which processing engine 112 is assigned to process the object in response to the query. Thus, for different queries, the ownership of the objects can change among the processing engines 112.

For example, a first query can specify: SELECT OID, SUM(Quantity) FROM T1 WHERE OID>0 GROUP BY 1.

In the first query, an aggregate function SUM is performed on the quantity attribute of the rows of table T1, to sum the values of the Quantity attribute. The "GROUP BY 1" clause performs a group-by operation on a specific attribute. The predicate OID>0 specifies that the selected rows are those with OID greater than zero.

For the first query, all 1,000 orders of table T1, which were previously inserted into first, second, third, and fourth objects 114, satisfy the predicate OID>0. To process the first query, the query partitioning logic 124 assigns objects 1 and 2 to the first processing engine 112, and assigns objects 3 and 4 to the second processing engine 112. The first processing engine 112 access the objects 1 and 2 and performs the operation of the first query on the data records of objects 1 and 2, and the second processing engine 112 access the objects 3 and 4 and performs the operation of the first query on the data records of objects 3 and 4.

At another time, a second query can be received, where the second query is as follows: SELECT OID, SUM(Quantity) FROM T1 WHERE OID≤500 GROUP BY 1.

In the second query, the predicate OID≤500 specifies that the selected rows are those with OID less than or equal 500. In this example, the rows in objects 1 and 2 satisfy the predicate, but the rows in objects 3 and 4 do not satisfy the predicate. As a result, objects 1 and 2 are accessed, but not objects 3 and 4. In this case, the query partitioning logic 124 assigns object 1 to the first processing engine 112, and assigns object 2 to the second processing engine 112.

Thus, at query time, the ownership of objects by the processing engines 112 can change for different queries.

In an example, rows of orders 1 to 250 have been inserted into object 1, rows of orders 251 to 500 have been inserted into object 2, rows of orders 501 to 750 have been inserted into object 3, and rows of orders 751 to 1,000 have been inserted into object 4.

Assume further that a subsequent insert has inserted object 5 with orders 1-250.

At query time, the query partitioning logic 124 can assign objects 1-5 to respective processing engines according to range partitioning according to some examples. Once data of the objects have been read into the processing engines 112, there does not have to be any network transfer (redistribution) of the data once the has been read by a processing engine. For large datasets, data redistribution can be a significant operation.

The benefits apply to other types of local operations, such as local join operations.

Figure 6:
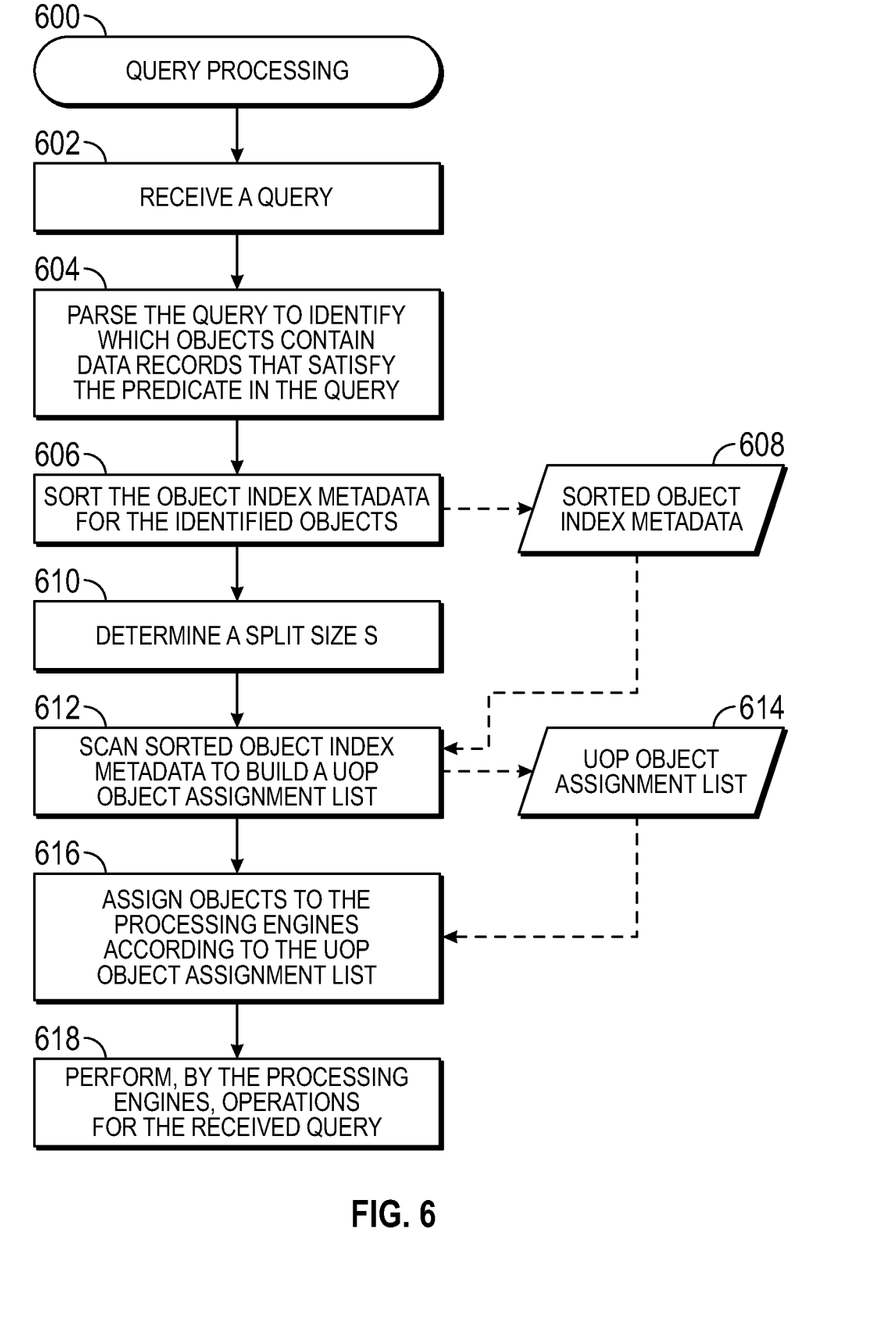
FIG. 6 is a flow diagram of query processing that employs range partitioning according to some examples.

FIG. 6 is a flow diagram of query processing 600 that can be performed by the parsing engine 110 of FIG. 1. The query partitioning logic 124 receives (at 602) a query, such as from a client device 120.

The parser 116 parses (at 604) the query to identify which objects 114 in the data store 104 contain data records that satisfy the predicate in the query.

The query partitioning logic 124 sorts (at 606) the object index metadata 126 for the identified objects based on the clustering attribute (which is the join attribute for a join operation). In the example discussed in relation with FIG. 6, it is assumed that there is just one clustering attribute. In other examples, there can be multiple clustering attributes.

The sorting of the object index metadata 126 (e.g., as shown in FIG. 3) produces a sorted object index metadata 608, which can be stored in a memory.

In some examples, the sorting of the object index metadata 126 is based on a midpoint value of the clustering attribute in the objects. The midpoint value is the midpoint between the minimum value and the maximum value of the clustering attribute of a respective object. For example, the midpoint value of the clustering attribute for object 1 is 101, which is computed from (1+201)/2. The midpoint value for object 2 is 305, which is computed from (202+408)/2. The midpoint values for the other objects are similarly computed.

Figure 4:
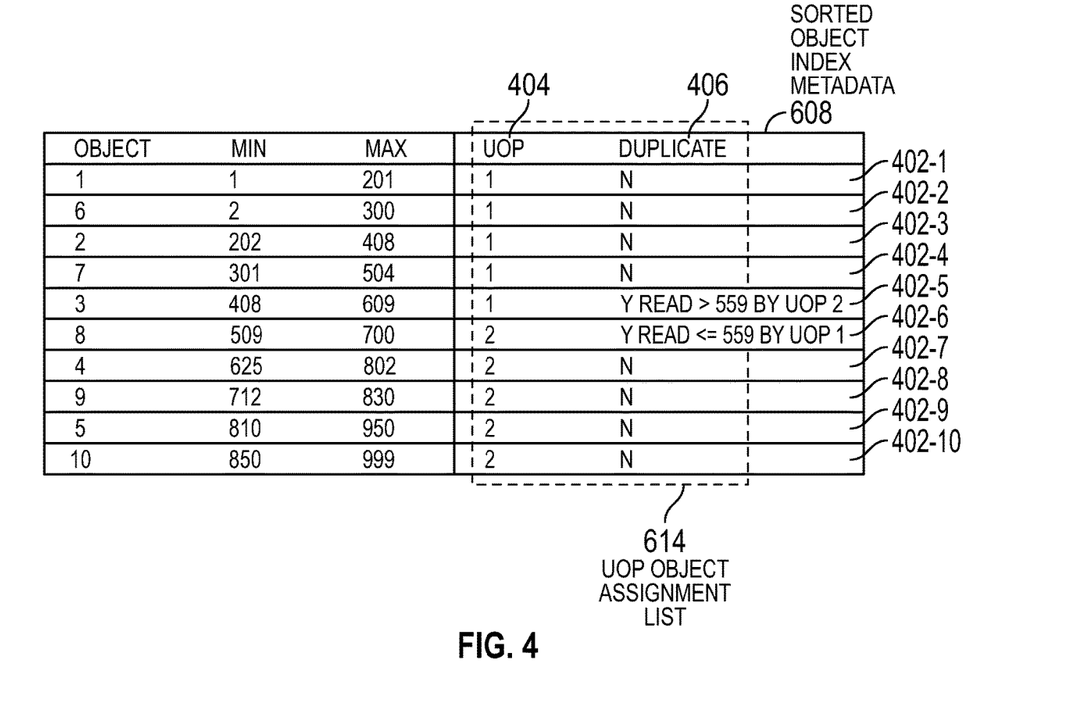
FIG. 4 illustrates a sorted object index metadata based on sorting the object index metadata, according to some examples.

Sorting based on the midpoint values of the clustering attribute can produce a sorted order of the objects according to an ascending order (for example) of the clustering attribute. FIG. 4 shows a sorted object index metadata 608 produced by sorting of the object index metadata 126. Entries 402-1 to 402-10 of the sorted object index metadata 608 are sorted based on midpoint clustering attribute values for respective objects 1-10. In the example of FIG. 4, the entry 402-1 of the sorted object index metadata 608 is for object 1, the entry 402-2 of the sorted object index metadata 608 is for object 6, the entry 402-3 of the sorted object index metadata 608 is for object 2, and so forth as shown in FIG. 4.

Referring again to FIG. 6, the query partitioning logic 124 determines (at 610) a split size S, which is equal to the number of identified objects divided by the number of processing engines 112. Thus, in an example where there are two processing engines 112 and the number of identified objects is 10, the split size S is equal to 5 (10/2). The split size determines the number of objects to assign to each processing engine, in this case 5. A goal of determining the split size is to assign an equal amount of data (or nearly equal amount of data) to each processing engine 112.

The query partitioning logic 124 scans (at 612) the sorted object index metadata 402 to build a UOP object assignment list 614, which can be stored in a memory. The UOP object assignment list 614 assigns objects to respective UOPs (processing engines 112 in FIG. 1). Although referred to as a "list," in other examples, other types of UOP object assignment data structures can be employed to assign objects to respective UOPs.

In the example shown in FIG. 4, the UOP object assignment list 614 can be included as part of the sorted object index metadata 608. In other examples, the UOP object assignment list 614 can be separate from the sorted object index metadata 608.

The UOP object assignment list 614 includes indications that assign respective objects to corresponding processing engines 112. For example, in the UOP object assignment list 614, a UOP attribute 404 if set to the value of "1" indicates that the object is assigned to a first processing engine 112, and the UOP attribute 404 if set to the value of "2" indicates that an object is assigned to a second processing engine 112.

In some examples, the UOP object assignment list 614 also includes a Duplicate attribute 406, which indicates whether or not an object can reside on multiple UOPs (or multiple processing engines 112 in the context of FIG. 1). In the UOP object assignment list 614, a Duplicate value of "N" indicates that the object is not located on more than one processing engine 112, while a Duplicate value of "Y" indicates that the object can be on multiple processing engines 112. In the example of FIG. 4, objects 1, 6, 2, 7, 4, 9, 5, and 10 are assigned to just one processing engine 112. However, objects 3 and 8, which are associated with the Duplicate value of "Y", are assigned to more than one processing engine 112. An object that is assigned to multiple processing engines 112 can mean that a first portion of the object is assigned to a first processing engine, a second portion of the object is assigned to a second processing engine, and so forth.

Figure 5:
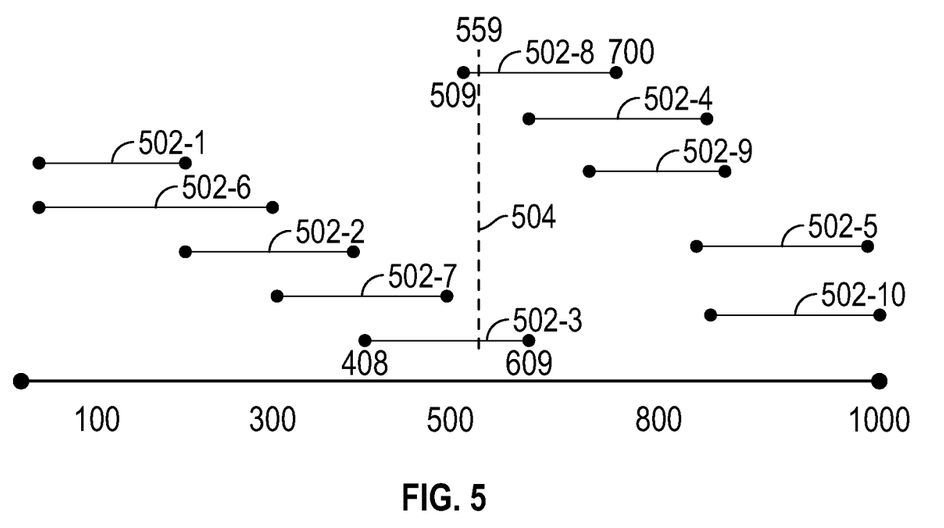
FIG. 5 is a graph illustrating a sorted object index metadata according to some examples.

FIG. 5 illustrates a graph that graphically shows the sorted object index metadata 608. More specifically, FIG. 5 shows the clustering attribute range for each object. The horizontal axis of FIG. 5 represents values of the clustering attribute.

Clustering attribute ranges 502-1 to 502-10 are shown in FIG. 5, where the clustering attribute ranges 502-1 to 502-10 correspond to objects 1-10, respectively. The clustering attribute range 502-1 represents the range of values (between a minimum value and a maximum value) of the clustering attribute of object 1, the clustering attribute range 502-2 represents the range of values of the clustering attribute of object 2, and so forth.

The clustering attribute ranges 502-1 to 502-10 are arranged in ascending order from left to right along the horizontal axis of the graph shown in FIG. 5. In the example of FIG. 5, an overlap range starts at the minimum value (509) of the clustering attribute range 502-8 for object 8, and ends at the maximum value (609) of the clustering attribute range 502-3 for object 3. The midpoint value between 509 and 609 is 559, which is represented by a vertical line 504 in FIG. 5. More generally, the vertical line 504 represents a split point between clustering attribute values for the first processing engine, and clustering attribute values for the second processing engine. In general, there are N−1 split points, where N represents the number of UOPs (processing engines). Each split point can have one or more objects that cross the split point.

The clustering attribute range 502-3 and the clustering attribute range 502-8 for objects 3 and 8, respectively, both cross the split point represented by vertical line 504. Thus, for object 8, data records in object 8 that have clustering attribute values that are less than or equal to 559 are processed by the first processing engine, and data records of object 8 having clustering attribute values greater than 559 are processed by the second processing engine. Similarly, for object 3, data records having clustering attribute values less than or equal to 559 are processed by the first processing engine, and data records having clustering attribute values greater than 559 are processed by the second processing engine.

In further examples, if the sorted object index metadata 608 is large (e.g., includes a number of entries that exceed a specified threshold), then sampling of the entries of the object index metadata 126 can be performed. For example, if 10% sampling is applied, then 10% of the entries of the object index metadata 126 are sorted to produce the sorted object index metadata 608, which includes just 10% of the entries of the object index metadata 126. Using sampling can reduce processing overhead associated with performing the range partitioning according to some implementations of the present disclosure.

As further shown in FIG. 6, the query partitioning logic 124 assigns (at 616) objects to the processing engines 112 based on the UOP object assignment list 614.

Each respective processing engine 112 then performs (at 618) the respective operations for the query received (at 602) on data records of the objects (or object portions) assigned to the respective processing engine 112.

The range partitioning depicted in FIGS. 3-6 can be applied for a single table, such as table T1 of a join operation. A similar range partitioning can be applied for another table, such as table T2 in the join operation.

In the example of FIG. 5, objects 3 and 8 both cross the split point represented by vertical line 504. Thus, for each object 3 or 8, data records in object 3 or 8 that have clustering attribute values that are less than or equal to 559 are processed by the first processing engine, and data records of object 3 or 8 having clustering attribute values greater than 559 are processed by the second processing engine.

In examples where an object containing the left table (e.g., T1) or the right table (e.g., T2) crosses a split point, the DBMS 102 can avoid having to retrieve the object multiple times from the remote data store 104 for the local join operations performed by multiple processing engines 112 on different data records of the object. The rows of the object that cross the split point can be stored in a cache memory 140 of the DBMS 102.

Thus, multiple processing engines 112 can access the rows of the object that cross the split point from the cache memory 140, without having to retrieve such rows multiple times from the remote data store 104.

Figure 7:
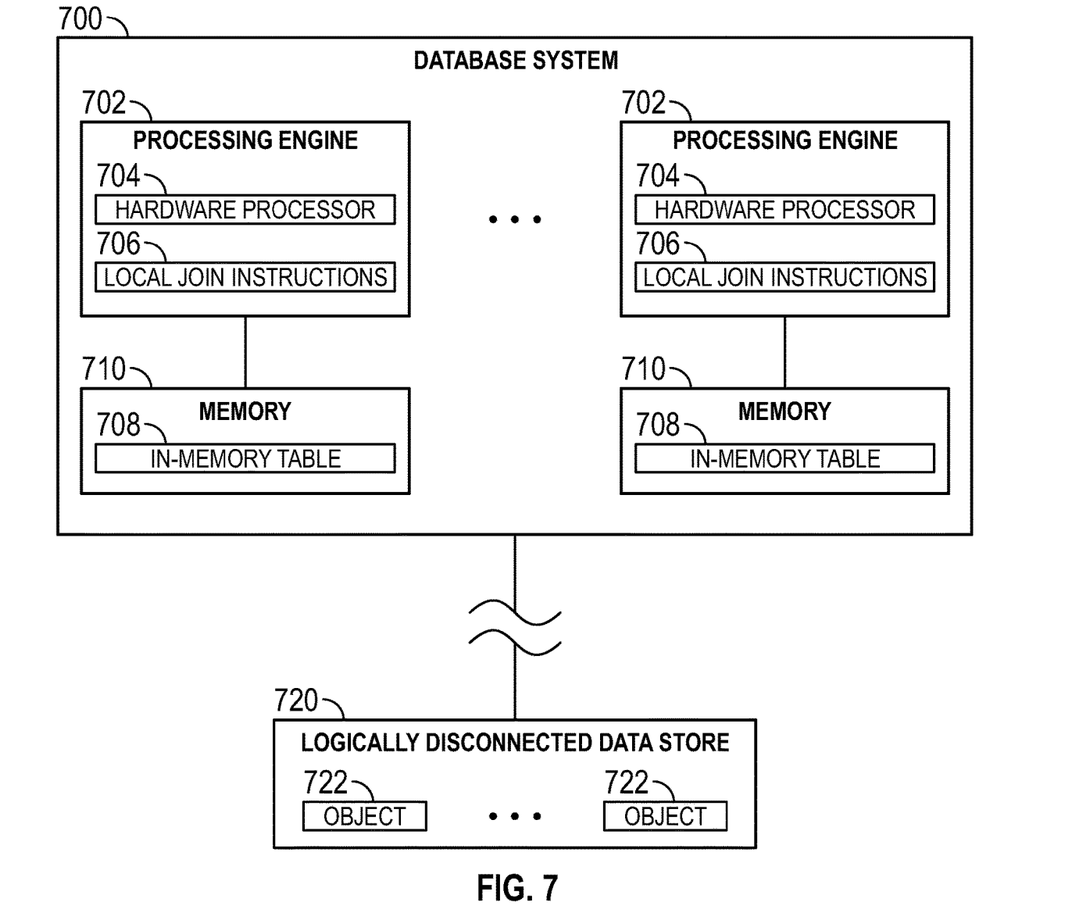
FIG. 7 is a block diagram of an example system according to some implementations of the present disclosure.

FIG. 7 is a block diagram of an example database system 700, such as the DBMS 102 of FIG. 1, according to some implementations of the present disclosure.

The system 700 includes multiple processing engines 702 (similar to 112 in FIG. 1) to access data in a logically disconnected data store 720 (e.g., similar to 104 in FIG. 1). The logically disconnected data store 720 is part a disconnected compute and storage architecture as discussed above, and stores objects 722.

Each processing engine 702 can include one or more hardware processors 704 that can execute machine-readable instructions to perform various tasks according to some implementations of the present disclosure. In some examples, a given processing engine 702 can perform a local join operation using range partitioning of objects 722 across the processing engines 702.

The machine-readable instructions of the given processing engine 702 can include local join instructions 706 that are executed on the one or more hardware processors 704 to performs respective tasks.

In response to a join query to join a plurality of tables, the local join instructions 706 retrieve tuples of a first table from a subset of objects 722 of the data store 720, and add content of the retrieved tuples to an in-memory table 708 (e.g., an in-memory hash table) stored in a local memory 710. The objects are range partitioned across the plurality of processing engines 702 based on respective ranges of values of at least one join attribute in the join query.

The local join instructions 706 retrieve, from the data store 720, tuples of a second table of the plurality of tables based on a range of values of the at least one join attribute in the retrieved tuples of the first table.

The local join instructions 706 perform an in-memory join of the plurality of tables based on the retrieved tuples of the second table and the in-memory table 708.

In some examples, techniques according to some implementations can eliminate having to redistribute table rows across the processing engines 112 prior to a join, so that a local join can be performed by each processing engine 112. Also, left table rows do not have to be duplicated in cases where the probe table is not redistributed for the join operation. The local join can support arbitrarily large left table without requiring fan out, where fan out is used to partition rows into groups so a hash table will fit into a memory.

In some examples, a smaller memory footprint is used by the local join than dynamic or classic hash joins. Use of a smaller hash table can result in cache hits in level 1 and level 2 processor cache memories, for example. In some examples, over time, the DBMS 102 can learn the UOP range assignment that can be used to increase physical cache hits.

Machine-readable instructions can be stored in a non-transitory machine-readable or computer-readable storage medium, which can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory or other type of non-volatile memory device; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A database system comprising:
   a memory to store object metadata of a first table, the object metadata comprising object ranges of values of a first attribute in respective plural objects of a remote data store coupled to the database system over a network;
   a plurality of processing engines comprising processors to access data of the plural objects over the network from the remote data store;

at least one processor to:
receive a join query comprising at least one join attribute to join a plurality of tables including the first table, the at least one join attribute comprising the first attribute;
based on the join query, sort the object ranges of the values of the first attribute in the object metadata based on midpoint values of the object ranges, to produce a sorted object metadata, wherein the sorting based on the midpoint values of the object ranges comprising ordering, in the sorted object metadata, a first object range having a first midpoint value before a second object range having a second midpoint value that is greater than the first midpoint value;
store the sorted object metadata in the memory; and
assign objects of the plural objects to the plurality of processing engines based on the sorted object metadata of the first table, wherein the plural objects contain tuples of the first table and are range partitioned across the plurality of processing engines based on the object ranges of the values of the first attribute that is part of the at least one join attribute in the join query, and
wherein a first processing engine of the plurality of processing engines is to:
retrieve tuples of the first table from objects of a subset of the plural objects, and add content of the retrieved tuples to an in-memory table;
retrieve, from the remote data store, tuples of a second table of the plurality of tables based on a range of values of the first attribute in the retrieved tuples of the first table; and
perform an in-memory join of the plurality of tables based on the retrieved tuples of the second table and the in-memory table.

2. The database system of claim 1, wherein the first processing engine is to record a minimum value of the first attribute and a maximum value of the first attribute of the retrieved tuples of the first table, wherein the range of values of the first attribute in the retrieved tuples of the first table is defined by the minimum value and the maximum value.

3. The database system of claim 2, wherein the first processing engine is to:
after the in-memory join of the plurality of tables based on the retrieved tuples of the second table and the in-memory table:
retrieve further tuples of the first table from the remote data store, and add further content of the retrieved further tuples to the in-memory table;
record a further minimum value of the first attribute and a further maximum value of the first attribute of the further tuples;
retrieve, from the remote data store, further tuples of the second table based on a further range of values of the first attribute defined by the further minimum value and the further maximum value; and
perform the in-memory join of the plurality of tables further based on the retrieved further tuples of the second table and the further content in the in-memory table.

4. The database system of claim 1, wherein the remote data store is a logically disconnected data store.

5. The database system of claim 1, wherein the assigning of the objects of the plural objects to the plurality of processing engines is based on an ordering of the object ranges in the sorted object metadata produced by the sorting based on the midpoint values.

6. The database system of claim 1, wherein the in-memory table is an in-memory hash table, and wherein the first processing engine is to:
add the content of the retrieved tuples of the first table to the in-memory hash table by applying a hashing function on the retrieved tuples of the first table to derive corresponding hash table keys, and placing the content of the retrieved tuples of the first table into buckets of the in-memory hash table based on the corresponding hash table keys.

7. The database system of claim 6, wherein the first processing engine is to:
add the content of the retrieved tuples of the first table to the in-memory hash table until a specified amount of the memory is occupied by the retrieved tuples of the first table.

8. The database system of claim 6, wherein the first processing engine is to:
perform the in-memory join of the plurality of tables based on probing the in-memory hash table with the retrieved tuples of the second table.

9. The database system of claim 1, wherein the first processing engine is to:
retrieve, from the remote data store, the tuples of the second table of the plurality of tables based on filtering the second table using the range of values of the first attribute in the retrieved tuples of the first table.

10. The database system of claim 9, wherein objects in the remote data store that contain the second table are associated with second table object metadata that includes ranges of values of the first attribute, wherein the filtering uses the ranges of values of the first attribute in the second table object metadata.

11. The database system of claim 1, wherein the at least one processor is to:
sample the sorted object metadata to select a portion of the sorted object metadata, the portion of the sorted object metadata having less entries than the sorted object metadata,
wherein the assigning of the objects of the plural objects to the plurality of processing engines is based on the portion of the sorted object metadata.

12. The database system of claim 1, wherein the first processing engine is to:
store, in a cache memory, the retrieved tuples of the first table, and
wherein a given object of the objects of the subset is associated with a range of values of the first attribute that crosses a split point between partitions defined by the range partitioning, and the given object contains a portion of the retrieved tuples of the first table stored in the cache memory, and wherein a second processing engine of the plurality of processing engines is to:
retrieve tuples of the first table from the cache memory when performing a join of the plurality of tables in response to the join query.

13. A non-transitory machine-readable storage medium comprising instructions that upon execution cause a database system to:
store, in a memory, object metadata of a first table, the object metadata comprising object ranges of values of a first attribute in respective plural objects of a remote data store coupled to the database system over a network, wherein an object range of the object ranges is defined by a minimum value and a maximum value of the first attribute in a corresponding object;

receive a join query comprising at least one join attribute to join a plurality of tables including the first table, the at least one join attribute comprising the first attribute;

based on the join query, sort the object ranges of the values of the first attribute in the object metadata based on midpoint values of the object ranges, to produce a sorted object metadata, wherein the sorting based on the midpoint values of the object ranges comprising ordering, in the sorted object metadata, a first object range having a first midpoint value before a second object range having a second midpoint value that is greater than the first midpoint value;

store the sorted object metadata in the memory;

assign objects of the plural objects to a plurality of processing engines of the database system based on the sorted object metadata of the first table, wherein the plural objects contain tuples of the first table and are range partitioned across the plurality of processing engines based on the object ranges of the values of the first attribute that is part of the at least one join attribute in the join query;

retrieve, at a first processing engine of the plurality of processing engines, tuples of the first table from objects of a subset of the plural objects, and add content of the retrieved tuples to an in-memory table;

retrieve, at the first processing engine from the remote data store, tuples of a second table of the plurality of tables based on a range of values of the first attribute in the retrieved tuples of the first table; and perform, at the first processing engine, an in-memory join of the plurality of tables based on the retrieved tuples of the second table and the in-memory table.

14. The non-transitory machine-readable storage medium of claim 13, wherein the instructions upon execution cause the database system to:

retrieve, at the first processing engine from the remote data store, the tuples of the second table based on filtering the second table using the range of values of the first attribute in the retrieved tuples of the first table.

15. The non-transitory machine-readable storage medium of claim 14, wherein objects in the remote data store that contain the second table are associated with second table object metadata that includes ranges of values of the first attribute that are associated with the objects that contain the second table, wherein the filtering uses the ranges of values of the first attribute in the second table object metadata.

16. The non-transitory machine-readable storage medium of claim 13, wherein the assigning of the objects of the plural objects to the plurality of processing engines is based on an ordering of the object ranges in the sorted object metadata produced by the sorting based on the midpoint values.

17. A method of a database system comprising a plurality of processing engines, comprising:

storing, in a memory, object metadata of a first table, the object metadata comprising object ranges of values of a first attribute in respective plural objects of a remote data store coupled to the database system over a network, wherein an object range of the object ranges is defined by a minimum value and a maximum value of the first attribute in a corresponding object;

receiving a join query to join a plurality of tables comprising the first table and a second table, the join query comprising at least one join attribute including the first attribute;

based on the join query, sorting the object ranges of the values of the first attribute in the object metadata based on midpoint values of the object ranges, to produce a sorted object metadata, wherein the sorting based on the midpoint values of the object ranges comprising ordering, in the sorted object metadata, a first object range having a first midpoint value before a second object range having a second midpoint value that is greater than the first midpoint value;

storing the sorted object metadata in the memory;

assigning objects of the plural objects to the plurality of processing engines based on the sorted object metadata of the first table, wherein the plural objects contain data records of the first table and are range partitioned across the plurality of processing engines based on the object ranges of the values of the first attribute;

retrieving, by a first processing engine of the plurality of processing engines, data records of the first table from a subset of the plural objects, and adding content of the retrieved data records to an in-memory table;

retrieving, by the first processing engine from the remote data store, data records of the second table from objects in the remote data store, based on a range of values of the first attribute in the retrieved data records of the first table; and performing, by the first processing engine, an in-memory join of the plurality of tables based on the retrieved data records of the second table and the in-memory table.

18. The method of claim 17, wherein the assigning of the objects of the plural objects to the plurality of processing engines is based on an ordering of the object ranges in the sorted object metadata produced by the sorting based on the midpoint values.

* * * * *